UNITED STATES PATENT OFFICE.

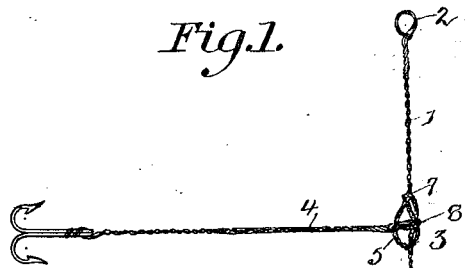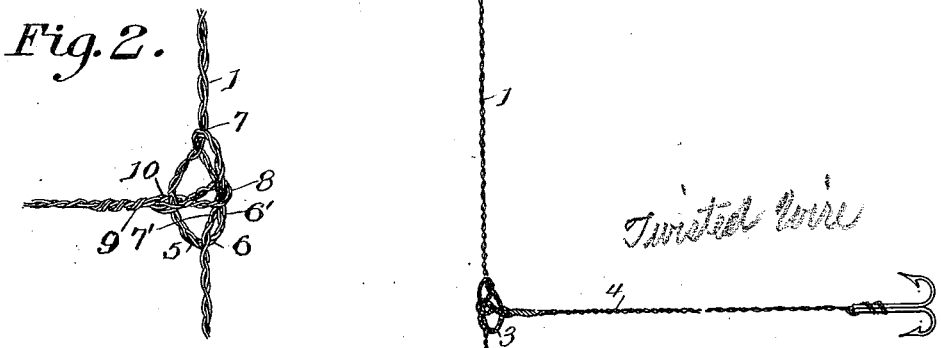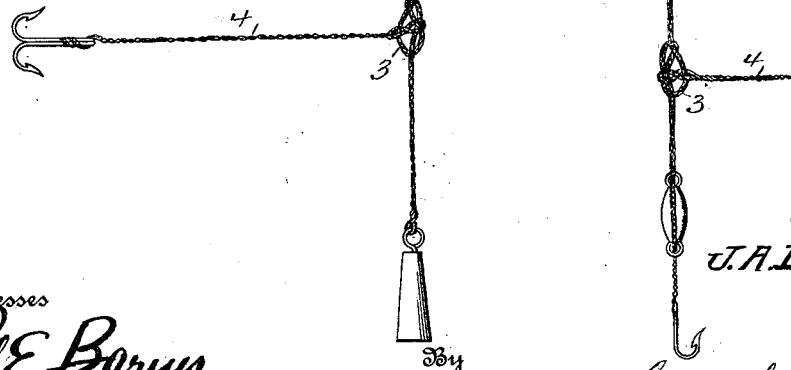

JAMES A. DENNIS, OF HENDERSON, KENTUCKY.

FISHING-LINE LEADER.

1,000,380.  Specification of Letters Patent.  Patented Aug. 15, 1911.

Application filed September 26, 1910. Serial No. 583,865.

*To all whom it may concern:*

Be it known that I, JAMES A. DENNIS, a citizen of the United States, residing at Henderson, in the county of Henderson and State of Kentucky, have invented certain new and useful Improvements in Fishing-Line Leaders, of which the following is a specification.

The invention relates generally to fishing line leaders, pertaining specifically to a leader adapted to maintain the coöperating hooks in the most efficient position in relation to the leader proper.

The essential features of the invention reside in a construction wherein the disposition of the main strand of the leader provides, at appropriate points throughout its length, a snell supporting anchor element formed integral with the said strand.

One object of the invention is the provision of a leader formed of non-rustable, pliable woven wire or the like provided with means to maintain hooks in desired outstanding relation to the main strand of said leader in position most effective to attract attention of fish and prevent the usual entanglement of the hook snell and leader.

Another object is to provide a leader which is readily attached to and disconnected from a fishing line and which, while adapted to be folded into little space and carried in the pocket, if desired, is, at the same time capable of assuming its full efficiency when unfolded from such position and extended to operative length.

With these as the primary objects of the construction the invention will now be described in the following specification, reference being had to the accompanying drawings, and then more particularly pointed out in the appended claims.

In the drawings, Figure 1 is an elevation of my improved leader showing several hooks maintained in extended relation to the main strand of the leader. Fig. 2 is an enlarged, broken perspective illustrating the looping of the main strand of the leader to provide a snell supporting element, and Fig. 3 is a broken elevation showing a form of the device in which the relative position of several of the parts is different from that in the preferred form.

Referring now to the drawings, in which is illustrated the embodiment of the preferred details of my invention, and wherein similar parts throughout the several figures are indicated by like reference characters, 1 denotes the main strand of my improved leader, formed of woven or twisted wire preferably of non-rustable material and provided at its upper terminal with attaching ring 2 formed integral with said strand and provided for convenient connection with the fishing line.

At appropriate points throughout the length of the leader are formed small snell-supporting elements 3, similarly formed of the main strand of the leader and designed for supporting and anchoring hook snells 4, formed of suitable length and of material similar to that of the strand 1.

The disposition of the wire forming supporting elements 3 integrally with the strand 1 is a salient feature of my invention and is accomplished by projecting the main strand, at a point at which it is desired to form the support, outwardly to form an approximately semi-circular loop 5 of a length appropriate to provide such loop throughout its length with reasonable rigidity for a purpose to be later explained.

At the lower terminal of loop 5 the strand is doubled as at 6 to provide portion 6' projected upwardly and passed around the main strand at point 7 where said strand is projected outwardly to form supporting loop 5, from which point 7 the strand is again doubled upon itself and extended downwardly to provide portion 7', the latter passing to the rear of and in contact with portion 6' at the point 8, said portion 7' being then passed through the loop formed by portion 6 and portion 5 on that side of strand 1 opposite to that contacting with portion 6' at the point 7, as best illustrated in Fig. 2 wherein, as in the other figures for purposes of clearness the various portions of the supporting anchor element are shown spaced somewhat farther apart than is contemplated in practice.

The elements 3 being formed as above described, the free end 9 of snells 4 are passed to one side of loop 5 at approximately its central point, through the loop formed by strand portions 6' and said loop 5 and passed tightly around portions 6' and 7' at their point of contact 8, then passed above and in contact with itself in the rear of and closely adjacent to loop 5, about which it is passed on that side thereof opposite to that on which it passed in the first instance, and then passed beneath that portion lying immediately forward of loop 5 where the contacting strands of the snell are tightly twisted upon each other for a suitable distance to form binding loop 10, the latter snugly embracing loop 5, such construction providing for maintaining the snell and attached hook in desired extended relation to the main strand 1, as clearly obvious, while at the same time preventing the tendency, commonly experienced with constructions embracing usual means of attaching the hook snells, of accidental movement of the snell upwardly or downwardly upon the leader or line out of desired position.

It will be readily seen from the above that I have provided a leader including means for securely anchoring hook snells in desired position and tending to maintain the hook-carrying end of said snells, when free of pressure, out of contact with the main strand of the leader and projecting outwardly therefrom in extended relation, while the leader, fully equipped with the desired number of hooks and snells and suitable sinker is adapted to be readily and conveniently attached by one operation to the fishing line and, when desired, as readily disconnected therefrom and folded into small compass, the latter capability in no wise diminishing the full efficiency of the device when again extended for use.

Having thus described my invention what I claim as new and desire to secure by Letters Patent, is:—

1. A fish line leader constructed to provide a snell-supporting element integral with said leader, said element including a rear portion approximately in line with the main strand of the leader, and a front portion spaced from the rear portion in outstanding relation to the line of direction of the main strand of the leader and a hook-carrying snell looped about each of said portions.

2. A leader formed at a determinate point in its length with a loop having the terminal strand thereof overlying the main length of the leader above the loop and then carried downwardly through the loop to provide spaced parallel looped portions and a hook-carrying snell looped about the main strand, intertwisted between the main strand and loop and looped over the loop of the snell-carrying leader.

In testimony whereof, I affix my signature in presence of two witnesses.

JAMES A. DENNIS.

Witnesses:
JOSEPH T. ROBINSON,
OTIS LEWIS.